(12) United States Patent
Bell et al.

(10) Patent No.: US 12,733,670 B2
(45) Date of Patent: Sep. 15, 2026

(54) BREADING AND SIFTING STATION

(71) Applicant: AyrKing, LLC, Oklahoma City, OK (US)

(72) Inventors: James D. Bell, Prospect, KY (US); William S. Eppehimer, Louisville, KY (US)

(73) Assignee: AyrKing, LLC, Oklahoma City, OK (US)

( * ) Notice: Subject to any disclaimer, the term of this patent is extended or adjusted under 35 U.S.C. 154(b) by 691 days.

(21) Appl. No.: 18/320,687

(22) Filed: May 19, 2023

(65) Prior Publication Data

US 2024/0381920 A1 Nov. 21, 2024

(51) Int. Cl.
*A23P 20/12* (2016.01)

(52) U.S. Cl.
CPC .................................... *A23P 20/12* (2016.08)

(58) Field of Classification Search
CPC ........... A23P 20/12; A23N 4/085; A23N 4/04; A21C 15/002; A23G 3/26
USPC ............................................................ 99/494
See application file for complete search history.

(56) References Cited

U.S. PATENT DOCUMENTS 2,756,425 A 7/1956 Webber
3,520,277 A * 7/1970 Gordon ............... A47J 37/1271 209/337
3,596,765 A * 8/1971 Beudin ..................... B03B 5/16 209/486
4,182,260 A 1/1980 Reece
4,458,586 A * 7/1984 Reed ........................ A23B 4/12 118/19
4,550,677 A 11/1985 Reese et al.
4,893,885 A 1/1990 Borello
4,936,246 A * 6/1990 Reece ...................... A21C 9/04 118/22
4,952,309 A 8/1990 King
5,051,169 A 9/1991 King
6,463,862 B1 10/2002 Kuhlman et al.
6,505,547 B1 * 1/2003 Burnett .................. A23L 17/75 118/18
6,726,024 B2 4/2004 Nakano et al.
7,610,864 B2 11/2009 LaMarche, II et al.
7,648,147 B2 1/2010 Lauer et al.
7,798,502 B2 9/2010 Sukey et al.
7,913,631 B2 3/2011 Hawkins
8,065,974 B1 11/2011 Rome
9,055,812 B2 6/2015 Fishman et al.
9,451,789 B2 9/2016 Harned et al.
9,491,967 B2 11/2016 Toothaker et al.
10,245,619 B2 4/2019 Ambroset et al.
10,349,737 B2 7/2019 Keller et al.
11,493,265 B2 11/2022 Sanders
(Continued)

FOREIGN PATENT DOCUMENTS

CN 2827126 Y 10/2006
CN 210470828 U 5/2020

*Primary Examiner* — Tiffany T Tran
(74) *Attorney, Agent, or Firm* — Dinsmore & Shohl LLP

(57) ABSTRACT

A breading and sifting apparatus is disclosed. The breading and sifting apparatus may include a sifter and a frame. The sifter is configured to be placed beneath a working surface. The working surface includes an opening. A breading lug is configured to be placed through the opening into the frame of the sifter, such that the sifter is retained relative to the working surface.

18 Claims, 5 Drawing Sheets

(56) References Cited

U.S. PATENT DOCUMENTS

| | | | | |
|---|---|---|---|---|
| 11,497,237 | B1 | 11/2022 | Bell et al. | |
| 2005/0028730 | A1* | 2/2005 | Chua | A23P 20/12<br>118/13 |
| 2007/0000436 | A1 | 1/2007 | Zweifel et al. | |
| 2007/0264397 | A1 | 11/2007 | Mather et al. | |
| 2014/0366750 | A1* | 12/2014 | Harned | A23P 20/12<br>99/494 |
| 2021/0088269 | A1* | 3/2021 | Sanders | A23L 13/03 |

* cited by examiner 130
122

122
130

BREADING AND SIFTING STATION

BACKGROUND

This disclosure relates generally to the field of food processing and more particularly to the field of breading applications for food products. More particularly, it relates to a breading and sifting station for manually breading food products and sifting the used breading to separate the dough balls from the still-usable breading material.

Breading, a particularly prevalent practice in food preparation nowadays, is the process of applying dry particulate material to a food product to enhance the flavor and facilitate cooking of the food product. The breading material may include, for example, bread crumbs, flour, and a variety of spices depending upon the food product to be breaded. Exemplary breaded food products include chicken breasts, chicken strips, chicken nuggets, chicken wings, fish sticks, fish patties, and a variety of other meats and vegetables. As the breaded food products are highly demanded by today's consumers, fast food restaurants, traditional dining establishments, and grocery stores all carry a variety of breaded food products.

The breading process typically requires an individual to apply the breading material to the food product in a bowl, dish, or basin that contains the breading material. The food product, such as a chicken breast, may be manually coated by rolling the chicken breast in the breading material and patting or massaging the breading material directly on the chicken breast. In order to adhere the breading material to the food product, the food product is typically battered before breading to make the food product moist. However, moisture may cause the breading material to clump together. Such clumped breading material may be unsuitable for further use. Accordingly, the clumps must be removed from the used breading material during the breading process.

To facilitate the breading and sifting process, a breading and sifting station is widely used in the food processing industry, such as in commercial kitchens. The breading and sifting station usually comprises a worktop for battering and breading, and an electrically-operated sifting assembly below the worktop. The sifting assembly is structured to sift the used breading material to separate the dough balls from the still-reusable breading material and then to convey the dough balls and the still-reusable breading material into two basin-shaped containers located underneath the sifting assembly, as disclosed in commonly owned U.S. Pat. No. 11,497,237, the entire disclosure of which is hereby incorporated by reference.

However, the design of a manual breading and sifting station may require the breading and sifting station to be mounted in a manner that does not efficiently use space within a commercial kitchen. As commercial kitchen real estate is at a premium, some kitchens are not large enough to have a separate breading and sifting station. But, it would still be desirable to have the functions of a breading and sifting station.

Therefore, breading and sifting station that addresses the above problems is desired.

SUMMARY

In view of the deficiencies described above, one object of the present disclosure is to provide a breading and sifting station that is easily positionable in a space-efficient location within a commercial kitchen. Another object is to retain the breading and sifting station relative to a separate working surface. The herein-described embodiments address these and other problems by providing a breading and sifting station that may easily fit beneath a working surface to more efficiently use the space within a commercial kitchen. The apparatus has been designed to couple the breading and sifting station to a separate working surface by using the breading lug inserted through an opening of the working surface so that the breading and sifting station may remain registered relative to the working surface.

In some embodiments, a breading and sifting apparatus comprises a sifter configured to be placed beneath a working surface. The working surface comprises an opening. A frame is coupled to the sifter, wherein the frame orients and places a breading lug into a position that is configured to be aligned with the opening of the working surface. A breading lug is configured to be disposed through the opening and retained by the frame.

In some embodiments, a method of retaining a breading and sifting apparatus relative to a working surface comprises: (a) aligning a sifter comprising a frame with an opening of a working surface, and (b) inserting a breading lug through the opening and into a frame of the sifter.

These and other advantages and features, which characterize the apparatus, are set forth in the claims annexed hereto and form a further part hereof. However, for a better understanding of the apparatus, and of the advantages and objectives attained through its use, reference should be made to the drawings, and to the accompanying descriptive matter, in which there is described example embodiments of the apparatus. This summary is merely provided to introduce a selection of concepts that are further described below in the detailed description, and is not intended to identify key or essential features of the claimed subject matter, nor is it intended to be used as an aid in limiting the scope of the claimed subject matter.

DETAILED DESCRIPTION

Figure 1:
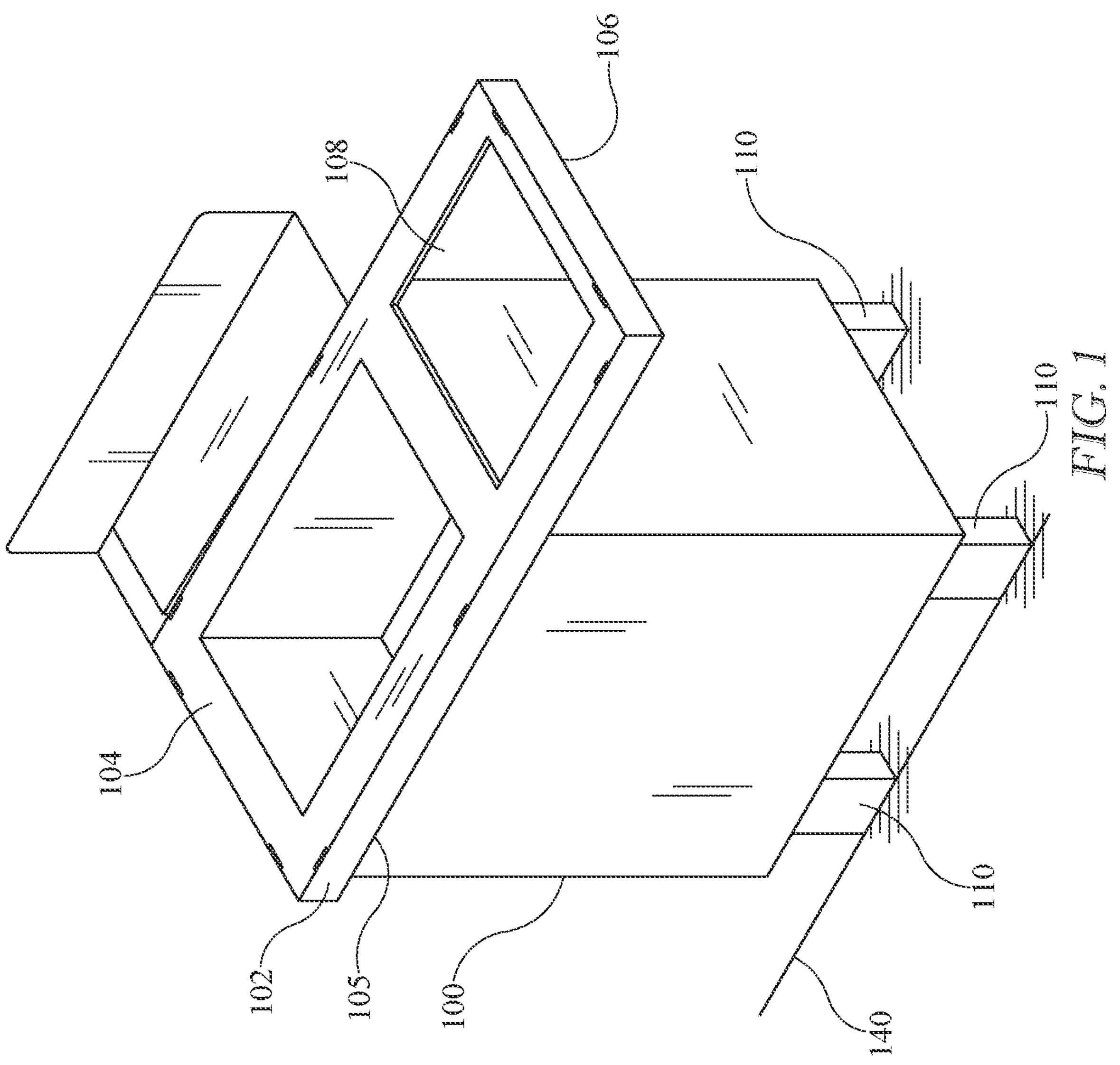
FIG. 1 schematically depicts a work station according to one or more embodiments shown and described herein.

The embodiments discussed hereinafter will focus on the implementation of the hereinafter-described apparatus and techniques within a breading and sifting station. However, it will be appreciated that the apparatus and techniques may also be used in connection with other types of equipment in some embodiments. For example, the herein-described designs may be used for a kitchen work table made by other manufacturers. Moreover, the apparatus may be useful in any form of work station requiring efficient mounting and simplicity of retaining multiple components relative to one another. Turning now to the drawings, wherein like numbers denote like parts throughout the several views, a work station 100 is shown in accordance with one embodiment of the present disclosure is depicted in FIG. 1. The work station 100 may be any suitable work station for food preparation and/or handling, including but not limited to a table or refrigerated table, a counter, an assembly line, or any other suitable work station. The work station 100 may include one or more supports 110. The supports 110 may support the work station 100 above a ground surface 140.

The work station 100 includes a working surface 102. The working surface 102 may be a substantially flat plane where food product may be stored and/or prepared thereon. The working surface 102 may further include one or more features for storing food product and/or food preparation equipment, such as bins or containers. The working surface 102 may include a top face 104 which is directed away from the ground surface 140, and a bottom face 105 which is directed towards the ground surface 140.

The working surface 102 may include an overhang section 106. The overhang section 106 may be a portion of the working surface 102 that is cantilevered from the working surface 102. There may be a space between the overhang section 106 of the working surface 102 and the ground surface 140.

The working surface 102 includes an opening 108. The opening 108 may be a section of the working surface 102 that has been removed between the top face 104 and the bottom face 105 such that objects may be passed through the opening 108. In some embodiments, the opening 108 may have a taper from the top face 104 and the bottom face 105, such that the opening 108 is larger at the top face 104 than the bottom face 105.

As illustrated, the opening 108 is arranged in the overhang section 106 of the working surface 102. However it should be understood that the opening 108 may be arranged in any suitable location of the working surface 102. Further, as illustrated, the opening 108 has a rectangular shape. However it should be understood that the opening 108 may be any suitable shape, including but not limited to a circle, an oval, a hexagon, or any other suitable shape.

Figure 2:
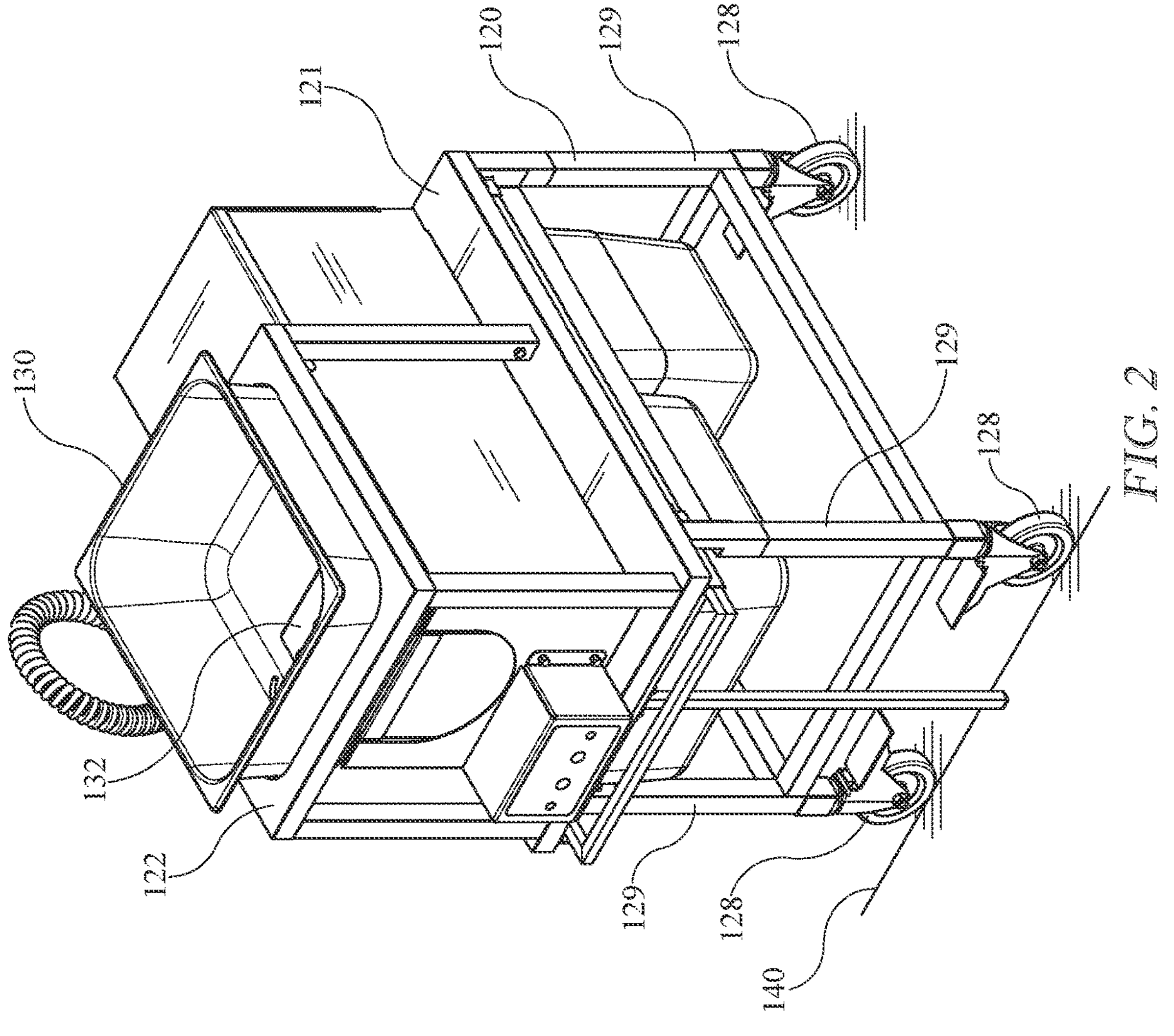
FIG. 2 schematically depicts a sifter and breading lug according to one or more embodiments shown and described herein.

Referring to FIG. 2, a sifter 120 and a breading lug 130 are shown. Used breading material may be diverted into the sifter 120 and then into a reusable collection pan and/or a waste collection pan next to (or inside) the reusable collection pan (if the portion of the used breading material is unable to be reused). The sifter 120 includes a top surface 121 facing away from the ground surface 140.

The sifter 120 may include one or more legs 129. The legs 129 may elevate the top surface 121 from the ground surface 140. The sifter 120 may include one or more casters 128. The casters 128 may be coupled to the legs 129. The casters 128 may allow for the sifter 120 to be moved about the ground surface 140 to a location beneath the working surface 102, removed from beneath the working surface 102, and/or otherwise moved about the ground surface 140. While casters 128 are illustrated, it should be understood that the sifter 120 may be placed beneath the working surface 102 with any suitable mechanisms, such as rollers, tracks, or any other suitable mechanism, or indeed with fixed feet.

The sifter 120 includes a frame 122. The frame 122 may be placed on the top surface 121 of the sifter 120. The frame 122 may be removably coupled to the sifter 120, such as by mechanical fasteners, geometric fastening, or any other suitable fastener. In other embodiments, the frame 122 may be fixed to the sifter 120, such as by welding.

The frame 122 is shaped and sized to retain the breading lug 130. The breading lug 130 may be used for applying a breading material to food product covered with or without batter. During the breading process, moisture from the batter or other sources may cause the formation of dough balls when the moisture mixes with the breading material, and some of the dough balls may remain in breading lug 130. When dough balls collect to a certain extent, they may interfere with the breading operation, so the dough balls have to be sifted therefrom in order for the remaining good breading material to be reused. For the sifting purpose, breading lug 130 may include a drain or opening 132 in the bottom surface through which a used breading material mixture may be passed, and a removable plug may be in the bottom thereof. Opening 132 may be plugged during breading process, or unplugged to allow passage of the used breading material mixture to fall into sifter 120 disposed below breading lug 130 through opening 132. Sifter 120 may be substantially vertically aligned underneath opening 132 of breading lug 130, so that the used breading material mixture, including the reusable breading material and dough balls coming out of opening 132 of breading lug 130 directly falls by gravity into sifter 120.

As illustrated, the breading lug 130 may be a substantially rectangular open receptacle; however, it should be understood that the breading lug 130 may be any other suitable shape, including but not limited to an open cylinder or a hexagonal open receptacle. In embodiments of the breading lug 130 which are not a rectangular open receptacle, the frame 122 may be shaped to accommodate the shape of the breading lug 130.

Figure 3:
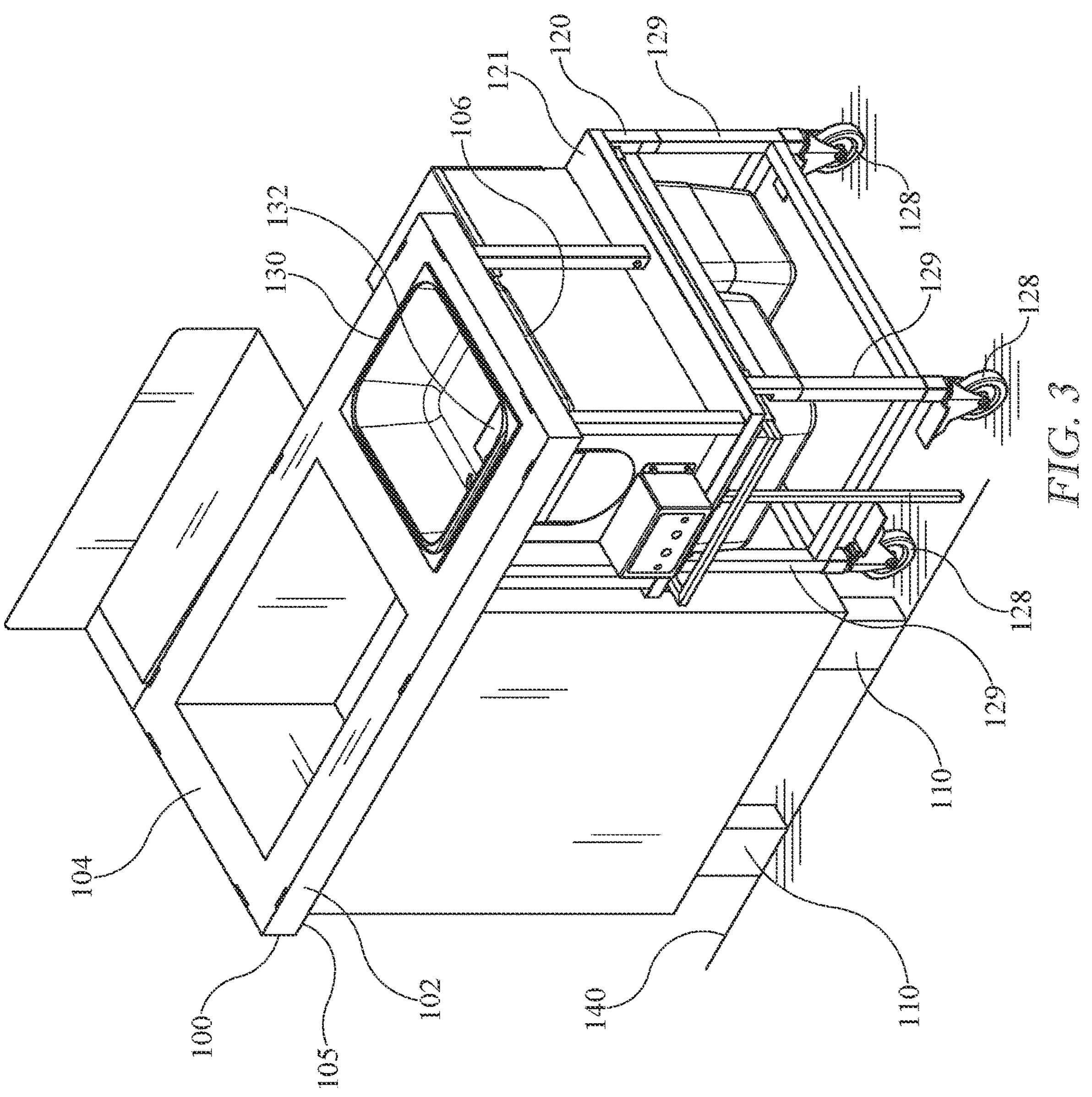
FIG. 3 schematically depicts a perspective view of a breading and sifting apparatus registered to a work station according to one or more embodiments shown and described herein.

Referring now to FIG. 3, a breading and sifting apparatus 10 in accordance with one embodiment of the present disclosure is depicted coupled to a work station 100. The breading and sifting apparatus 10 further includes the sifter 120. The sifter 120 is shaped and sized so as to be placed beneath the working surface 102. As illustrated, the sifter 120 may be arranged beneath the overhang section 106 of the working surface 102, but it should be understood that the sifter 120 may be arranged in any suitable location underneath the working surface 102, such as a cabinet, between multiple supports 110, or other locations with adequate size to allow the sifter 120 to be placed underneath the working surface 102.

The frame 122 of the sifter 120 is substantially vertically aligned with the opening 108, such that the breading lug 130 is inserted through the opening 108 and retained by the frame 122. The breading lug 130 is inserted through the opening 108 and thereby couples the sifter 120 to the work station 100, such that the breading lug 130 is a mechanical link between the sifter 120 and the work station 100. In other words, when the breading lug 130 is inserted through the opening 108 and retained by the frame 122, the sifter 120 may not easily move along the ground surface 140 independently of the work station 100. That is, the sifter 120 and the work station 100 are now physically registered to one another so as to act in unison. This may allow the breading and sifting apparatus 10 to be moved as a single unit, such that the work station 100, sifter 120, and breading lug 130 may all move as one. Further, this may prevent the work station 100 or sifter 120 from becoming accidentally dislodged or misaligned if one or both is bumped or accidentally touched.

Breading and sifting apparatus 10 may be used in a commercial setting for high-volume breading of food products, including but not limited to a fast-food restaurant or a commercial kitchen.

Figure 4:
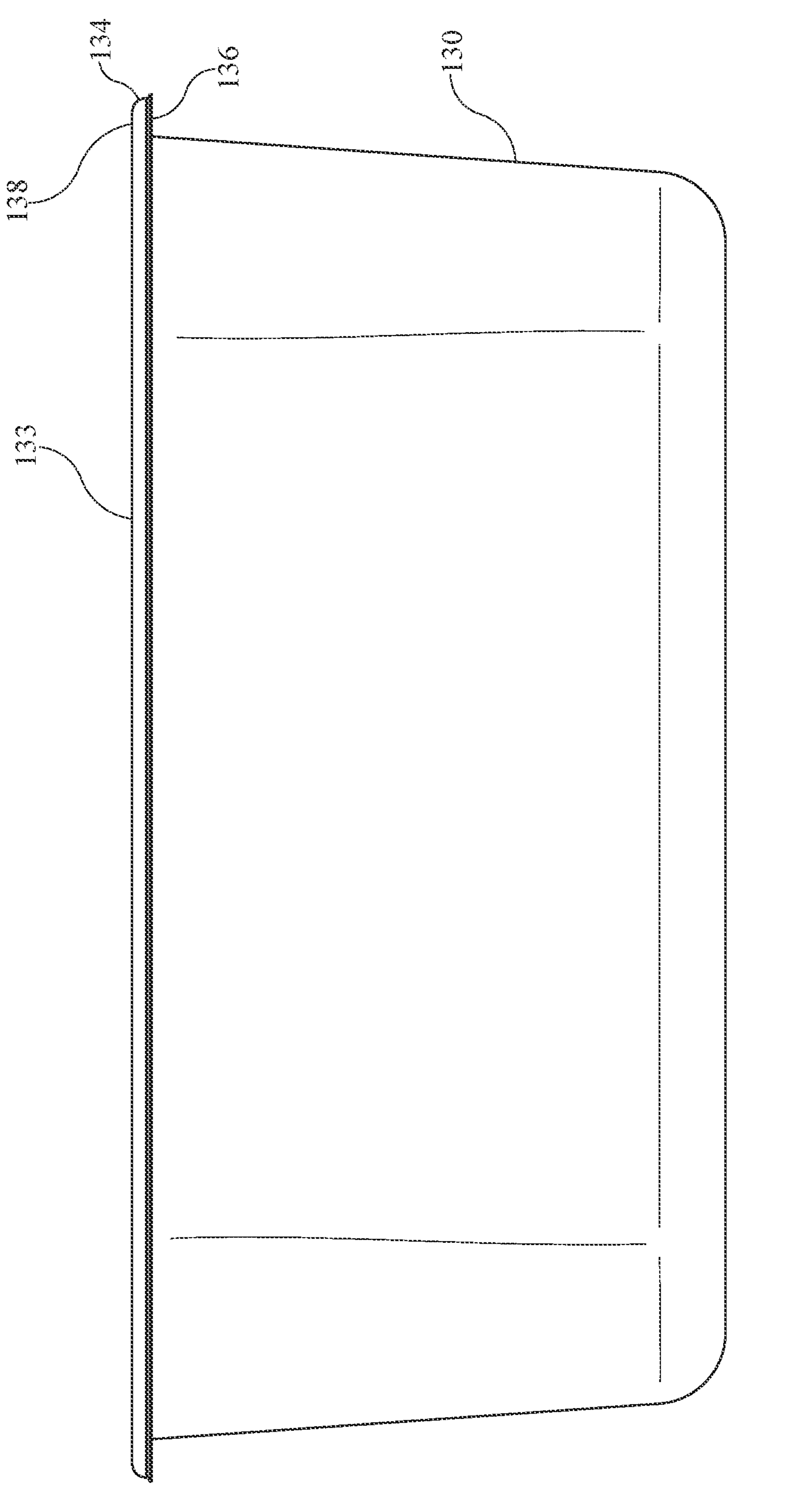
FIG. 4 schematically depicts a breading lug according to one or more embodiments shown and described herein.

Referring now to FIG. 4, a front view of the breading lug 130 is shown in accordance with one embodiment of the present disclosure. As illustrated, the breading lug 130 has a rectangular front profile, however it should be understood that the breading lug 130 may have any suitably shaped front profile, including but not limited to a trapezoid, a semi-circle, or a triangle. The breading lug 130 may include a flange 134. The flange 134 may be arranged around the perimeter of the breading lug 130 at a top edge 133 of the breading lug 130. The flange 134 may be used by an operator to grasp the breading lug 130 and insert the breading lug 130 through the opening 108 so that the breading lug 130 may be retained by the frame 122.

The flange 134 may include a bottom surface 136 and a top surface 138. In some embodiments, the bottom surface 136 of the flange 134 may contact the top face 104 of the work station 100 when the breading lug 130 is inserted through the opening 108 and retained by the frame 122. This may allow the top edge 133 of the breading lug 130 to be flush relative to the top face 104 of the work station 100, which may allow for an operator to easily sweep breading material that has fallen onto the working surface 102 back into the breading lug 130.

In other embodiments, there may be a gap between the bottom surface 136 of the flange 134 and the top face 104 of the work station 100 when the breading lug 130 is inserted through the opening 108 and retained by the frame 122.

Figures 5A, 5B:
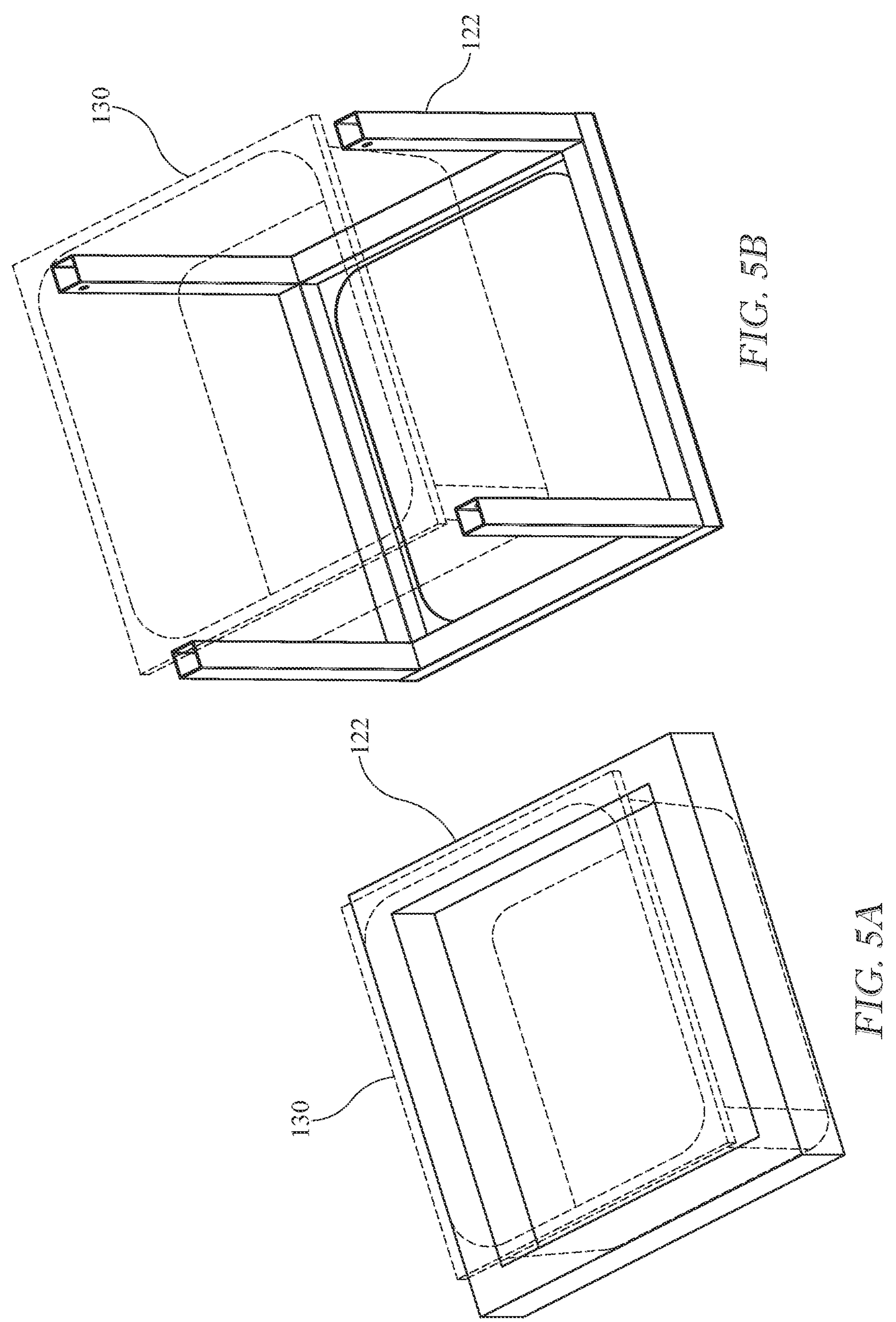
FIG. 5A schematically depicts a frame for retaining a breading lug according to one or more embodiments shown and described herein.
FIG. 5B schematically depicts a frame for retaining a breading lug according to one or more embodiments shown and described herein.

Referring now to FIG. 5A, a perspective view of the frame 122 separate from the sifter 120 is shown in accordance with one embodiment of the present disclosure. The frame 122 is illustrated as having a perimeter that may fully surround the breading lug 130 (shown in phantom), although a full perimeter is not required. As illustrated, the frame 122 is constructed of sections of square tubing, but it should be understood that the frame 122 may be constructed of any suitable shape of material, such as cylindrical tubing, L-brackets, I-beams, plates, and the like.

In some embodiments, the frame 122 may be a smaller size than the breading lug 130, such that there is an interference fit between the frame 122 and the breading lug 130. That is, the frame 122 and/or breading lug 130 may deform slightly when the breading lug 130 is retained by the frame 122. In other embodiments, the frame 122 may be a larger size than the breading lug 130. In yet further embodiments, the frame 122 may be tapered towards the top surface 121 of the sifter 120. The frame 122 may retain the breading lug 130 so that a portion of the breading lug 130 is above the frame 122.

Referring now to FIG. 5B, a perspective view of the frame 122 separate from the sifter 120 is shown in accordance with one embodiment of the present disclosure. The frame 122 is illustrated as a plurality of uprights. The uprights may each contact a portion of the breading lug 130 (shown in phantom) to retain the breading lug 130. In FIG. 5B one exemplary embodiment is shown wherein the corners of the breading lug 130 are contacted by the components of the frame 122, but any portion of the breading lug 130 could be used. As illustrated, the frame 122 includes four uprights, but it should be understood that the frame 122 may include any suitable number of uprights, such as two uprights, five uprights, eight uprights, or any other suitable number of uprights. Further, it should be understood that the uprights may contact the breading lug 130 at locations other than the corner of the breading lug 130.

The upright frame 122 may be arranged in a similar manner to that described above for the perimeter frame 122. That is, the upright frame 122 may be an interference fit with the breading lug 130 or there may be a space between the upright frame 122 and the breading lug 130 when the breading lug 130 is retained by the upright frame 122. Further, the upright frame 122 may be tapered towards the top surface 121 of the sifter 120. The frame 122 may retain the breading lug 130 so that a portion of the breading lug 130 is above each upright of the frame 122.

A method for retaining a sifter 120 relative to a working surface 102 is also provided. The steps may start by aligning the sifter 120 including the frame 122 with the opening 108 of the working surface 102. The user then inserts the breading lug 130 through the opening 108 into the frame 122 of the sifter 120.

In some embodiments, the sifter 120 is located beneath the working surface 102. The sifter 120 may be located beneath the overhang section 106 of the working surface 102. In some embodiments, the breading lug 130 includes the flange 134, and the breading lug 130 is moved through the opening 108 until the flange 134 is flush with the working surface 102.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used.

Those skilled in the art may recognize, or be able to ascertain using no more than routine experimentation, equivalents to the specific embodiments described herein. It is, therefore, to be understood that the foregoing embodiments are presented by way of example only and that, within the scope of the appended claims and equivalents thereto, embodiments may be practiced otherwise than as specifically described, yet still be encompassed by the claims. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. Other embodiments can be being practiced or carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments has been presented for purposes of illustration. It is not intended to be exhaustive or to limit the scope to the precise steps and/or forms disclosed, and obviously many modifications and variations are possible in light of the above teaching. Various additional modifications may be made to the illustrated embodiments consistent with the spirit of the invention.

What is claimed is:

1. A breading and sifting apparatus comprising:
- a sifter placeable beneath an opening of a working surface;
- a frame coupled to the sifter so as to be movable with the sifter relative to the working surface; and
- a breading lug, the breading lug being retained by the frame after insertion through the opening,
- wherein as the breading lug is inserted through the opening, the frame orients and places the breading lug into a position that is aligned with the opening.

2. The breading and sifting apparatus of claim 1, wherein the sifter is configured to be retained relative to the working surface when the breading lug is retained by the frame.

3. The breading and sifting apparatus of claim 1, wherein the working surface is a refrigerated table.

4. The breading and sifting apparatus of claim 1, wherein the frame further comprises a perimeter, and wherein the perimeter is configured to be placed around a portion of the breading lug.

5. The breading and sifting apparatus of claim 1, wherein the frame further comprises a plurality of uprights, and wherein the uprights are configured to be placed around a portion of the breading lug.

6. The breading and sifting apparatus of claim 1, wherein the sifter is mounted on a plurality of casters.

7. The breading and sifting apparatus of claim 1, wherein:
- the breading lug further comprises a flange comprising a bottom surface; and
- the bottom surface of the flange of the breading lug is configured to contact a top face of the working surface when the breading lug is retained by the frame.

8. The breading and sifting apparatus of claim 1, wherein:
- the breading lug further comprises a flange comprising a bottom surface; and
- the bottom surface of the flange of the breading lug is configured to be spaced apart from a top face of the working surface when the breading lug is retained by the frame.

9. The breading and sifting apparatus of claim 1, wherein the frame is arranged on a top surface of the sifter.

10. The breading and sifting apparatus of claim 1, wherein the sifter is configured to be aligned with the opening in the working surface arranged in an overhang section of the working surface.

11. The breading and sifting apparatus of claim 1, wherein the frame and the breading lug comprise an interference fit.

12. The breading and sifting apparatus of claim 1, wherein the breading lug comprises a rectangular open receptacle.

13. The breading and sifting apparatus of claim 1, wherein the frame is coupled to the sifter by one or more mechanical fasteners.

14. The breading and sifting apparatus of claim 1, wherein the frame is coupled to the sifter by welding.

15. A method of retaining a breading and sifting apparatus relative to a working surface, the steps comprising:

(a) providing a breading and sifting apparatus, the breading and sifting apparatus comprising:

a sifter placeable beneath an opening of a working surface;

a frame coupled to the sifter so as to be movable with the sifter relative to the working surface; and a breading lug;

(b) moving the sifter and the frame into alignment with the opening of the working surface; and (c) inserting the breading lug through the opening and into the frame to at least partially prevent the sifter and the frame from moving relative to the working surface.

16. The method of claim 15, wherein step (b) further comprises locating the sifter beneath the working surface.

17. The method of claim 16, wherein step (b) further comprises locating the sifter beneath an overhang section of the working surface.

18. The method of claim 15, wherein the breading lug further comprises a flange, and wherein step (c) further comprises moving the breading lug through the opening until the flange is flush with the working surface.

* * * * *